United States Patent
Jacob

(10) Patent No.: US 6,702,682 B2
(45) Date of Patent: *Mar. 9, 2004

(54) OUTER JOINT PART FOR A CONSTANT VELOCITY JOINT

(75) Inventor: Werner Jacob, Frankfurt (DE)

(73) Assignee: GKN Lobro GmbH (DE)

( * ) Notice: Subject to any disclaimer, the term of this patent is extended or adjusted under 35 U.S.C. 154(b) by 51 days.

This patent is subject to a terminal disclaimer.

(21) Appl. No.: 10/080,366

(22) Filed: Feb. 21, 2002

(65) Prior Publication Data

US 2002/0115492 A1 Aug. 22, 2002

(30) Foreign Application Priority Data

Feb. 21, 2001 (DE) .......................................... 101 08 365
Feb. 21, 2001 (DE) .......................................... 101 08 366

(51) Int. Cl.⁷ .............................................. F16D 3/223
(52) U.S. Cl. ..................... 464/145; 464/906; 403/359.6
(58) Field of Search ................. 464/145, 178, 464/906; 384/513, 544; 29/898.066; 301/105.1; 403/359.6

(56) References Cited

U.S. PATENT DOCUMENTS 1,386,255 A * 8/1921 Hindle et al. ....... 29/898.066 X
2,875,600 A * 3/1959 Miller, Jr. .................... 464/145
3,822,570 A * 7/1974 Fisher ................... 464/906 X
4,455,734 A * 6/1984 Yoshioka et al. ....... 464/906 X
5,221,233 A   6/1993 Jacob
5,549,514 A * 8/1996 Welschof ..................... 464/145
6,261,184 B1  7/2001 Jacob et al.
6,267,683 B1 * 7/2001 Jacob .......................... 464/145
6,524,012 B1 * 2/2003 Uchman ................. 464/178 X
6,551,190 B2 * 4/2003 Hofmann et al. ....... 464/145 X

FOREIGN PATENT DOCUMENTS

DE    40 23 020 A1 * 1/1992 .............. 301/105.1
JP    55-72921    * 6/1980 .................. 464/145
JP    2-299902    * 12/1990 .............. 301/105.1

* cited by examiner

Primary Examiner—Greg Binda

(57) ABSTRACT

An annular outer part (2) for a constant velocity joint. In its inner wall (10), the annular outer part (2) includes circumferentially distributed first outer grooves and second outer grooves (13) which start from different end faces (8) and (9) respectively and extend towards the respective other end face in an undercut-free way. First webs (16) and second webs (21) which correspond to the first outer grooves (11) and second outer grooves (13) are projectingly arranged on the cylindrical outer face (15) of the outer joint part (2). In sectional planes (19, 20) containing the groove base (12, 14) of the respective outer groove (11, 13), the outer faces (17) of the webs (16, 21) follow the groove base (12, 14) at a constant distance. There is provided an outer joint part whose wall thickness, if viewed on the circumference, is largely unchanging. In addition, it is possible to use the webs for accommodating the outer joint part in a receiving part in a rotationally fast way.

18 Claims, 2 Drawing Sheets

OUTER JOINT PART FOR A CONSTANT VELOCITY JOINT

TECHNICAL FIELD

The present invention relates to an annular outer joint part for a constant velocity joint.

BACKGROUND OF THE INVENTION

The invention relates to an annular outer joint part for a constant velocity joint, comprising a first end face and a second end face. In the inner wall of the outer joint part, there are arranged first outer grooves which start from the first end face and extend to the second end face, with the first groove base approaching the longitudinal axis toward the second end face, and having second outer grooves which start from the second end face and extend to the first end face, with the second groove base approaching the longitudinal axis toward the first end face, wherein the first outer grooves and the second outer grooves alternate on the circumference of the inner wall.

U.S. Pat. No. 5,221,233 describes a constant velocity joint wherein the annular outer joint part, in its inner wall, comprises first and second outer grooves which start from different end faces and alternate on the circumference of the inner wall.

Opposite the first and second outer grooves, there are arranged first and second inner grooves of an inner part which is positioned in the outer joint part, wherein the first inner grooves start from the first end face from which the first outer grooves also start and wherein the groove base of the first inner grooves extends from the first end face to the second end face with an increasing distance from the longitudinal axis, whereas the groove base of the first outer grooves approaches the longitudinal axis from the first end face to the second end face. Accordingly, the second inner grooves and the second outer grooves start and extend from the second end face.

Between the outer joint part and the inner joint part there is arranged a cage which guides balls engaging opposed inner and outer grooves. To keep the depth of the first outer grooves and the second outer grooves as constant as possible, the webs arranged on the circumference of the inner wall between each two outer grooves are divided, so that there are obtained two web portions which, together, form parts of a hollow spherical inner face in the outer part, but the partial faces are axially and circumferentially offset at the inner wall. The tool required for such an outer joint part is complicated. Furthermore, by applying a force in the radial direction, the outer joint part is divided into two individual annular segments. These are accommodated in a bore of a bell after the inner part has been assembled with the cage and the balls. The bell supports the outer part in the radial direction. To achieve a rotationally fast connection, one of the end faces of the outer joint part has been provided with recesses. After the unit has been inserted, the wall of the bell is deformed in such a way that material in the region of the recesses of the outer joint part is displaced. The bell itself serves to establish a connection with a driving or driven part.

U.S. Pat. No. 6,261,184 describes a constant velocity joint with an annular outer part which is produced from plate metal and, especially, is composed of segments and which include first outer grooves and second outer grooves. It is formed of plate metal strips. The annular segments are received in a receiving part which is formed of plate metal and includes recesses in which the recesses of the segments forming the outer running grooves, are received. The joint produced from plate metal is particularly suitable for applications wherein the torque to be transmitted is relatively small and wherein it is important that there is no play. The elasticity of the plate metal makes it possible to achieve close tolerances because a limited elasticity does not adversely affect the guidance of the cage.

It would be desirable to provide an outer joint part for a constant velocity joint having a simplified construction.

SUMMARY OF THE INVENTION

The present invention provides an outer joint part for a constant velocity joint, including first and second outer grooves whose depth in the region between the first and the second end face is substantially constant, with the production process having been simplified.

In accordance with the invention, an annular outer joint part for a constant velocity joint is provided. The outer joint part includes a first longitudinal axis, a first end face and a second end face. First outer grooves are arranged in the inner wall. The first outer grooves start from the first end face and extend to the second end face, with the first groove base approaching the longitudinal axis toward the second end face. Second outer grooves start from the second end face and extend to the first end face, with the second groove base approaching the longitudinal axis toward the first end face. The first outer grooves and the second outer groove alternate on the circumference of the inner wall. The outer joint part also includes an outer face from which there project first webs and second webs which extend parallel to the longitudinal axis and alternate on the circumference. The first webs are arranged so as to correspond to the first outer grooves. Thus, they start from the first end face, and—when viewed in first sectional planes which extend through the longitudinal axis and through the first groove base of the associated first outer grooves—end in front of the second end face. The second webs are arranged so as to correspond to the second outer grooves. Thus, they start from the second end face and—when viewed in second sectional planes which extend through the longitudinal axis and through the second groove base of the second outer grooves—end in front of the first end face.

An advantage of the present invention is that over the important operating range (range of angle of articulation) of a constant velocity joint in which such an outer joint part is used, it is possible to achieve an approximately constant depth of the outer grooves, so that the load applied to the part of the outer joint part is substantially constant and the degree to which the torque transmitting ability is dependent on the articulation angle is more advantageous. A further substantial advantage is that no special measures are required at the outer joint part for torque transmitting purposes, i.e. the torque connection between the outer joint part and a receiving part. The webs can at the same time be used for torque transmitting purposes. A special advantage is due to the fact that the wall thickness of the outer joint part in the region between the two end faces and in the circumferential direction does not comprise any substantial steps, so that, during the required heat treatment, i.e. hardening, the risk of distortion is minimized.

In particular, this advantage results if the outer faces of the first webs in the first sectional planes and the second webs in the second sectional planes, while starting from the respective end faces from which they start, follow the groove base of the respective associated outer groove at identical distances and end in the outer face.

A further embodiment is advantageous with respect to production if each web is delimited by an outer face which, in any cross-section intersecting the longitudinal axis at a right angle, extends in a circular arch around the longitudinal axis, and by two planar flanks which extend parallel to the associated first and second sectional plane. The two planar flanks advantageously affect the transmission of torque.

The remaining part of the outer face, in its region which is free of webs, is provided in the form of a cylindrical face around the longitudinal axis. It can be used for centering the outer joint part in a receiving part.

The outer faces of all webs, together, form part of an imaginary cylindrical face around the longitudinal axis. In order to increase the production accuracy when using non-chip forming deformation, between each two first outer grooves and second outer grooves following one another on the circumference of the inner wall, there is provided a groove which extends parallel to the longitudinal axis. During calibration, for example, displaced material can escape into this groove.

Furthermore, it is possible to divide the outer joint part along a groove through a slot in order to facilitate the assembly of a constant velocity joint which includes the outer joint part.

Non-chip producing deformation is also facilitated if the end face includes a first region in which the end face is arranged on a plane which intersects the longitudinal axis at a right angle and, in the direction pointing towards the longitudinal axis, changes into a second region which is arranged on a conical face, the conical face being tapered towards the longitudinal axis.

According to a further embodiment of the invention, there are provided inner webs which are arranged in the circumferential direction between two outer grooves following one another and which are divided into first inner web portions and second inner web portions, which outer joint part is interrupted by one single separating join or groove which is introduced after the final dimensions have been produced by machining and subsequent hardening and extends between the inner web portions of an inner web.

The advantage of this design is that the elasticity of the outer joint part can be used for mounting a thicker cage which is suitable for larger articulation angles. Mounting is simplified because the outer joint part remains a complete component. In this way it is possible to prevent parts from being moved together which do not belong together. The operation of moving parts together is eliminated.

In one embodiment, the separating join is provided in the form of a slot which is produced by a chip-forming operation. The outer joint part is centered in a receiving part in such a way that the slot is maintained in its production size. In particular, this can be achieved if the outer joint part comprises webs and if the receiving part is provided with matching recesses which center the outer joint part. In this way it is ensured that no displacement can take place in the circumferential direction of the outer joint part, i.e. the outer joint part cannot be bent open or pressed together, which would have adverse effects on the play conditions of the constant velocity joint. For example, the outer joint part in the form of a round blank can be given its final dimensions by deep-drawing or sizing. Separation takes place in the hard condition, i.e. after the outer joint part has been hardened, for example by using a separating disc.

Alternatively, the outer joint part can be produced from a through-hardening material, and the separating join can be a brittle fracture. Together with the separating join, the outer joint part is subjected to a heat treatment in the sense of tempering in order to achieve the necessary toughness.

An assembly having an inventive outer joint part and a receiving part in which it is received is also provided. The receiving part includes a receiving bore in which the outer face of the outer joint part is received in a centered way, as well as receiving grooves in which the webs are received. The receiving part can be provided in the form of a wheel hub for a driven wheel of a motor vehicle.

For sealing purposes towards the outer joint part, the receiving part is closed by a cap and at least part of the remaining space is filled with a filler material.

Other advantages of the invention will become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

A preferred embodiment of the invention and its use in a wheel bearing assembly is diagrammatically illustrated in the drawings wherein.

DETAILED DESCRIPTION OF THE INVENTION

Figure 4:
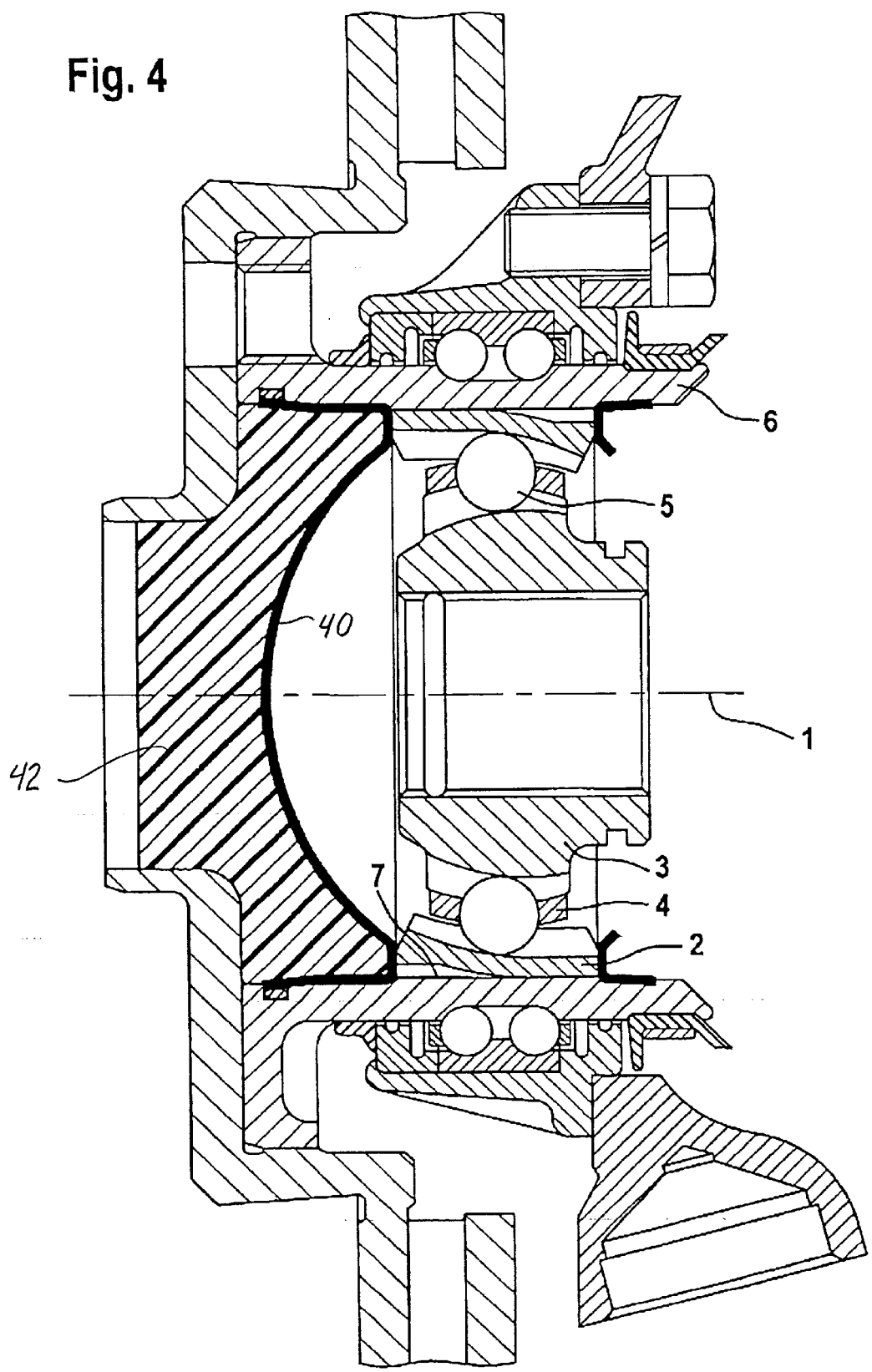
FIG. 4 is a longitudinal section through a wheel bearing assembly having an outer joint part according to FIGS. 1 to 3.

Referring first to FIG. 4, there is shown an inventive outer joint part 2 in a wheel bearing unit. All components are arranged in a centered way on the longitudinal axis 1. The constant velocity joint serving to drive a wheel includes the outer joint part 2, the inner joint part 3 received in the outer joint part 2, the cage 4 arranged between the outer joint part 2 and the inner joint part 3 and serving to guide balls 5 which engage outer grooves and inner grooves in the outer joint part 2 and inner joint part 3 respectively. The constant velocity joint with the above components is shown in the non-articulated condition so that the longitudinal axes of all components coincide with the longitudinal axis 1. The outer joint part 2 is secured in the receiving bore 7 of the receiving part 6 which forms the inner bearing ring of the wheel bearing. To provide the rotational drive between the receiving part 6 and the outer joint part 2, there are provided webs at the outer joint part 2 which engage grooves in the receiving bore 7 of the receiving part 6, which grooves which are correspondingly circumferentially distributed and extend parallel to the longitudinal axis 1. Furthermore, it can be seen that, towards the wheel flange, the joint interior is closed by a formed plate metal part 40 in the shape of a cap. The space 42 remaining between the wheel flange and the brake disc is partially filled with a filler material. The receiving part 6 is produced so as to be integral with the wheel flange.

Figure 3:
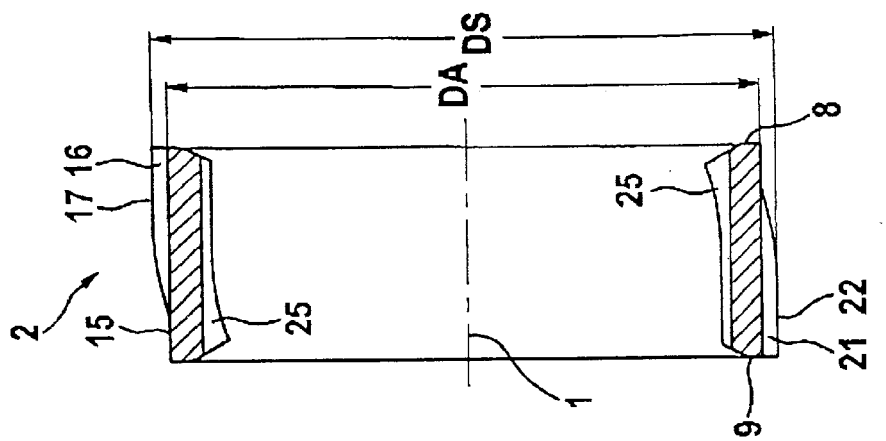
FIG. 3 is a longitudinal section along sectional line III—III of FIG. 1.
Figure 1:
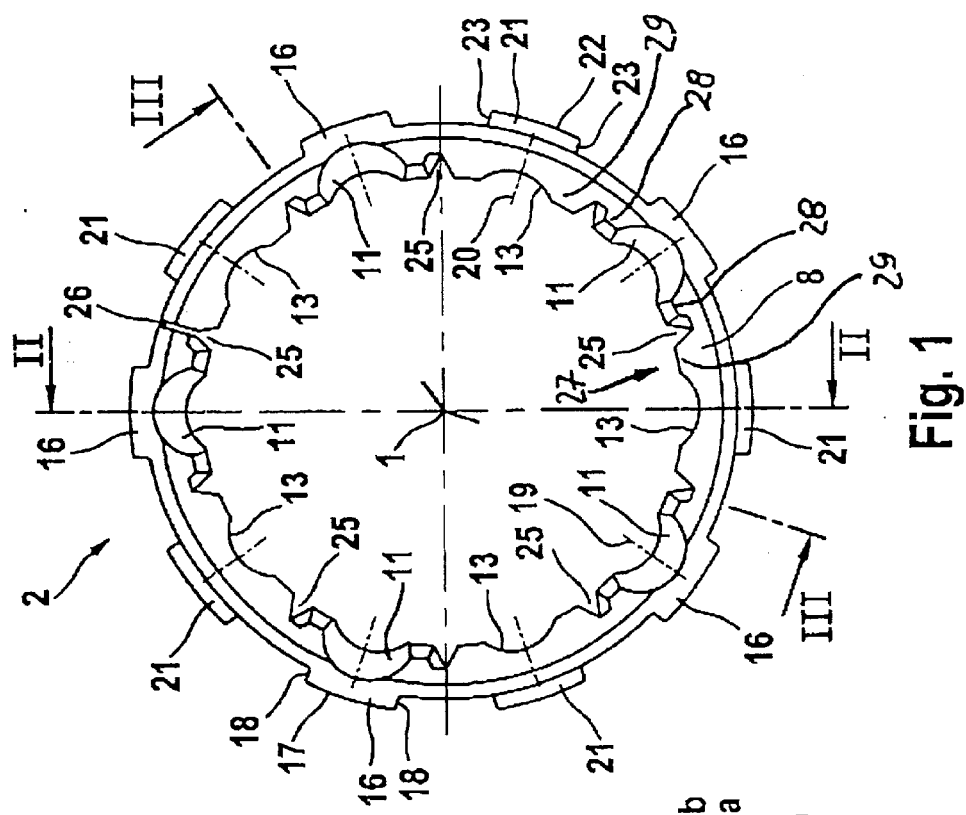
FIG. 1 is an end view of an outer joint part in accordance with an embodiment of the invention.
Figure 2:
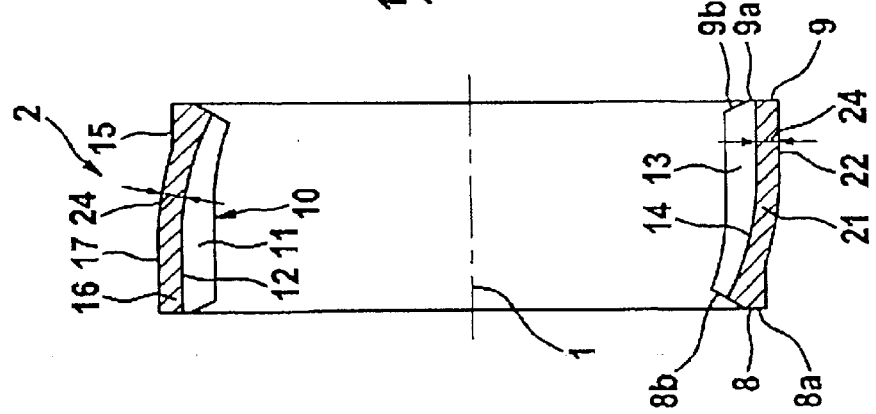
FIG. 2 is a longitudinal section along sectional line II—II of FIG. 1.

The outer joint part 2 received in the receiving part 6 will be described below in greater detail with reference to FIGS. 1 to 3.

The outer joint part 2 includes a first end face 8 and a second end face 9. Both end faces 8, 9 include a planar region 8a, 9a and a conical region 8b, 9b. The conical region 8b, 9b forms part of an imaginary cone whose center is located in the region between the two end faces 8, 9 and is centered on the longitudinal axis 1. The planar region 8a extends perpendicularly relative to the longitudinal axis 1.

The outer joint part 2 has an annular shape and is open at the end faces 8, 9. In the inner wall 10 of the outer joint part 2 there are provided first outer grooves 11 and second outer grooves 13 which alternate and are distributed around the longitudinal axis 1. The first outer grooves 11 extend from the first end face 8 in an undercut-free way towards the second end face 9, with the first groove base 12 of the first outer grooves 11 starting from the first end face 8, extending towards the second end face 9 and approaching the longitudinal axis 1. The second outer grooves 13 start from the second end face 9 and extend towards the first end face 8 in an undercut-free way, with the second groove base 14 of the second outer grooves 13 starting from the second end face 9, extending towards the first end face 8 and approaching the longitudinal axis 1.

The outer joint part 2 Includes an outer face 15 which is cylindrical in shape with an outer diameter DA. First webs 16 and second webs 21 project from the outer face 15. The first webs 16 are arranged in such a way that they correspond to the first outer grooves 11. In the first sectional planes 19 through the first groove base 12 and the longitudinal axis 1, the outer face 17 of the first web 16 follows, at a substantially constant distance, the course of the first groove base 12, starting from the first end face 8 and extending towards the second end face 9, and ends in the cylindrical outer face 15. Each first web 16 is delimited, on the one hand, by the outer face 17 which forms part of a cylindrical face with the diameter DS and which is centered on the longitudinal axis 1 and, on the other hand, by two flanks 18 which extend parallel to the first sectional planes 19. The outer face 17 thus extends with a circular arch around the longitudinal axis 1. Second webs 21 which correspond to the second outer grooves 13 project from the outer face 15. The second webs 21 include outer faces 22 which are also part of an imaginary cylindrical face centered on the longitudinal axis 1, i.e. in a cross-section and in the plan view according to FIG. 1 they extend in a circular arch. The outer face 22, while starting from the second end face 9 and extending towards the first end face 8, follows the second groove base 14 of the second grooves 13 in second sectional planes 20 at a constant distance therefrom and ends away from the second end face 9 in the cylindrical outer face 15. The second webs 21 are delimited by the outer face 22 and its two flanks 23, with the two flanks 23 extending parallel to the two sectional planes 20.

It can be seen that the distance 24 between the respective groove base 12, 14 and the outer face 17, 22 of the associated first web 16 and second web 21 respectively remains substantially constant. In the inner wall 10, in the webs 16, 21 between two circumferentially adjoining first outer grooves 11 and second outer grooves 12, there are worked-in grooves 25 which extend parallel to the longitudinal axis 1. In particular, the grooves 25 are visible in FIG. 3.

In the inner wall 10, in the inner webs 27 between two circumferentially adjoining first outer grooves 11 and second outer grooves 13, there are worked-in grooves 25 which extend parallel to the longitudinal axis 1. Furthermore, along a groove 25 there is provided a separating join 26 in the form of a slot which interrupts the annular shape of the outer joint part 2 in one place. The separating join 26 can be made to correlate, the outer joint part 2 will be centered in the receiving part. As a result, the slot can be maintained in size because no displacement can occur in the circumferential direction. In one example, the outer joint 2 part in the form of a round blank can be given its final dimensions by deep-drawing or sizing. Separation takes place in the hardened condition, i.e., after the outer joint part has been hardened, for example, by using a separating disc. Alternatively, the outer joint part 2 can be produced from a through-hardening material, and the separating join 26 can be a brittle fracture. Together with the separating join 26, the outer joint part 2 is subjected to a heat treatment in the sense of tempering in order to achieve the necessary toughness.

The inner webs 27 are divided into two inner web portions, i.e. a first inner web portion 28 and a second inner web portion 29 which are separated by the groove 25. The first inner web portions 28 accompany the first outer grooves 11 laterally and theft inner contour extends in an undercut-free way from the second end face 9 and, as far as the first end face 8, approaches the longitudinal axis 1 where it is at its smallest distance from the longitudinal axis 1. The inner contour of the second inner web portions 29 extends in an undercut-free way from the first end face 8 towards the second end face 9, with its distance from the longitudinal axis 1 decreasing. Between the regions (ends) of the first inner web portions 28 near the first end face 9 and those of the second inner web portions 29 near the first end face 8, there occurs an undercut region.

The separating join (slot) 26 of the outer joint part 2 can be used for connecting the finish-treated outer joint part 2 to the unit consisting of cage, inner part and balls.

Assembly takes place as described below. First the inner joint part 3 is threaded into the cage 4. Assembly can take place in such a way that, initially, the longitudinal axes of the cage 4 and of the inner joint part 3 intersect one another at right angles. Then the axes of the two parts are aligned relative to one another. Subsequently, the unit consisting of the cage 4 and the inner joint part 3 is tipped into the outer joint part 2, whereupon a ball 5 is threaded from the outside into a cage window by over-articulating the parts in question and thereafter, after the unit has been turned by one pitch of the pairs of tracks, the next ball is introduced. Finally, those balls are introduced which are associated with those outer grooves 11, 13 of the outer part 2 which adjoin the separating join 26.

In a preferred embodiment, the outer joint part, while starting from an annular part in the form of a solid formed part or a round blank or a tube is produced by a non-chip-producing method.

From the foregoing, it can be seen that there has been brought to the art a new and improved outer joint part for a constant velocity joint. While the invention has been described in connection with one or more embodiments, it should be understood that the invention is not limited to those embodiments. Thus, the invention covers all alternatives, modifications, and equivalents as may be included in the spirit and scope of the appended claims.

What is claimed is:

1. An A unitary annular outer joint part for a constant velocity joint comprising:

an inner wall (10) and an outer face (15);

a first longitudinal axis (1);

a first end face (8) and a second end face (9);

first outer grooves (11) arranged in the inner wall (10), which start from the first end face (8) and extend to the second end face (9), with a first groove base (12) approaching the longitudinal axis (1) towards the second end face (9), and second outer grooves (13) which start from the second end face (9) and extend to the first end face (8), with a second groove base (14) approaching the longitudinal axis (1) towards the first end face (8), wherein the first outer grooves (11) and the second outer grooves (13) alternate on a circumference of the inner wall (10); and first webs (16) and second webs (21) projecting from the outer face (15) and which extend parallel to the longitudinal axis (1) and alternate on a circumference of the outer face (15), wherein the first webs (16) are arranged to correspond to the first outer grooves (11) and start from the first end face (8) and end before the second end face (9), and wherein the second webs (21) are arranged to correspond to the second outer grooves (13) and start from the second end face (9) and end before the first end face (8).

2. An outer joint part according to claim 1, wherein an outer face (17) of the first webs (16) and an outer face (22) of the second webs (21), while starting from the respective end faces from which they start, follow the groove bases (12, 14) of the respective associated outer grooves (it 13) at a constant distance and end in the outer face (15).

3. An outer joint part according to claim 2, wherein the outer faces (17, 22) of the first and second webs (16, 20), respectively, in any cross-section intersecting the longitudinal axis (1) at a right angle, extend in a circular arch around the longitudinal axis (1), and include two planar flanks (18, 23) which extend parallel to associated first and second sectional planes (19, 20), respectively, said first and second sectional planes (19, 20) extending through the longitudinal axis (1) and the first and second groove bases (12, 14), respectively.

4. An outer joint part according to claim 3, wherein along a groove (25), the outer joint part is divided by a slot (26).

5. An outer joint part according to claim 1, wherein the outer faces (17, 22) of the first and second webs (16, 21) form part of a cylindrical face (DS) around the longitudinal axis (1).

6. An outer joint part according to claim 1, wherein between each first outer groove (11) and second outer groove (13) following one another on the circumference of the inner wall (10), there is provided a groove (25) which extends parallel to the longitudinal axis (1).

7. An outer joint part according to claim 1, wherein the outer face (15) comprises a cylindrical face (DA) around the longitudinal axis (1) in its regions not occupied by said first and second webs (16,21).

8. An outer joint part according to claim 1 wherein at least one of the first and second end faces (8, 9) comprises a first region arranged on a plane which intersects the longitudinal axis (1) at a right angle followed by a second region which is arranged on a conical face, said conical face being tapered towards the longitudinal axis.

9. An outer joint part according to claim 1 comprising inner webs (27) which are arranged in the circumferential direction between each of said first and second outer grooves (11, 13) and which are divided into first inner web portions (28) and second inner web portions (29).

10. An outer joint part according to claim 9, wherein the outer joint part is interrupted by a separating join extending between the first and second inner web portions (28, 29) of one of said inner webs (27).

11. An outer joint part according to claim 10, wherein said separating join is introduced after final dimensioning of the outer joint part by machining and after hardening of the outer joint part.

12. An outer joint part according to claim 10, wherein the separating join is provided in the form of a slot (26) and when the outer joint part is received in a receiving part (6) in a centered way, the slot size is maintained substantially constant.

13. An outer joint part according to claim 10, wherein the outer joint part is produced from a through-hardening material, the separating join (26) comprises a brittle fracture, and the outer joint part and the separating join (26) thereafter are subjected to a tempering heat treatment.

14. An assembly comprising:

a unitary annular outer joint part for a constant velocity joint comprising an inner wall (10) and an outer face (15), a first longitudinal axis (1), a first end face (8) and a second end face (9), first outer grooves (11) arranged in the inner wall (10), which start from the first end face (8) and extend to the second end face (9), with a first groove base (12) approaching the longitudinal axis (1) towards the second end face (9), and second outer grooves (13) which start from the second end face (9) and extend to the first end face (8), with a second groove base (14) approaching the longitudinal axis (1) towards the first end face (8), wherein the first outer grooves (11) and the second outer grooves (13) alternate on a circumference of the inner wall (10), first webs (16) and second webs (21) projecting from the outer face (15) and which extend parallel to the longitudinal axis (1) and alternate on a circumference of the outer face (15), wherein the first webs (16) are arranged to correspond to the first outer grooves (11), and start from the first end face (8), and end before the second end face (9), and wherein the second webs (21) are arranged to correspond to the second outer grooves (13) and start from the second end face (9) and end before the first end face (8); and a receiving part (6) comprising a receiving bore (7) in which the outer face (15) of the outer joint part (2) is received in a centered way, and receiving grooves in which the first and second webs (16, 21) are received.

15. An assembly according to claim 14, wherein the receiving part (6) is provided in the form of a wheel hub for a driven wheel of a motor vehicle.

16. An assembly according to claim 14, wherein towards the outer joint part (2), the receiving part (6) is closed by a cap (40).

17. An assembly according to claim 16, wherein said cap (40) and said receiving part (6) define a region (42) and said region (42) is filled, at least in part, by a filler material.

18. A unitary annular outer joint part for a constant velocity joint comprising:

an inner wall (10) and an outer face (15);

a first longitudinal axis (1);

a first end face (8) and a second end face (9);

first outer grooves (11) arranged in the inner wall (10), which start from the first end face (8) and extend to the second end face (9), with a first groove base (12) approaching the longitudinal axis (1) towards the second end face (9), and second outer grooves (13) which start from the second end face (9) and extend to the first end face (8), with a second groove base (14) approaching the longitudinal axis (1) towards the first end face (8), wherein the first outer grooves (11) and the second outer grooves (13) alternate on a circumference of the inner wall (10); and first webs (16) and second webs (21) projecting from the outer face (15) and which extend parallel to the longitudinal axis (1) and alternate on a circumference of the outer face (15), the first and second webs (16, 212) comprising respective outer faces (17, 22) which, starting from respective end faces (8, 9) of the outer joint part, follow the groove base (12, 14) of the respective associated outer groove (11, 13) at a substantially constant distance and terminate in the outer face (15).

* * * * *